US007730107B1

(12) United States Patent
Shultz et al.

(10) Patent No.: US 7,730,107 B1
(45) Date of Patent: Jun. 1, 2010

(54) SYSTEM AND METHOD FOR UPDATING AND SHARING PRIVATE LIBRARY PROFILE DATA TO FACILITATE DELIVERY OF ELECTRONIC CONTENT TO LIBRARIES

(75) Inventors: Robert Scott Shultz, Lewis Center, OH (US); Joanna White, Dublin, OH (US); Kathleen Quinton, Westerville, OH (US); Jeffrey Allen Young, Columbus, OH (US)

(73) Assignee: OCLC Online Computer Library Center, Inc., Dublin, OH (US)

( * ) Notice: Subject to any disclaimer, the term of this patent is extended or adjusted under 35 U.S.C. 154(b) by 272 days.

(21) Appl. No.: 11/840,623

(22) Filed: Aug. 17, 2007

(51) Int. Cl.
*G06F 17/00* (2006.01)
(52) U.S. Cl. .................................. 707/802; 715/234
(58) Field of Classification Search ............. 707/802; 715/234
See application file for complete search history.

(56) References Cited

U.S. PATENT DOCUMENTS

| | | | | |
|---|---|---|---|---|
| 6,029,195 | A * | 2/2000 | Herz | 725/116 |
| 7,409,393 | B2 * | 8/2008 | Gregoire et al. | 707/10 |
| 2004/0260781 | A1 * | 12/2004 | Shostack et al. | 709/207 |
| 2005/0160167 | A1 * | 7/2005 | Cheng et al. | 709/224 |
| 2008/0162537 | A1 * | 7/2008 | Mancini | 707/102 |

OTHER PUBLICATIONS

Feather, Celeste and Shultz, Scott, WorldCat Registry, Making the case for a comprehensive registry of library data, PowerPoint Presentation, Feb. 22, 2007, 36 pages, Georgia Institute of Technology.
WorldCat Registry offers management of organizational data, OCLC Online Computer Library Center, Inc., Press Release, Feb. 26, 2007, 2 pages, Dublin, Ohio.

\* cited by examiner

*Primary Examiner*—Shahid A Alam
*Assistant Examiner*—Noosha Arjomandi
(74) *Attorney, Agent, or Firm*—Standley Law Group LLP

(57) ABSTRACT

A service registry that supports updating and sharing of profile data with partners. The registry allows organizations such as libraries and consortia to manage and share data that define their organizations (e.g., institution type, location, main and branch institutions, URLs for electronic services, circulation statistics, and population served). Organizations share a RSS-enabled obfuscated link with their partners that enables the partners to access a page with the latest institutional profile, and to be notified when it is updated. The obfuscation of the RSS feed provides a notification while keeping the data private. Every time a user creates an institutional profile, an equivalent RSS-enabled page is generated that can be reached through a RSS feed that has an obfuscated link name. The user shares this link with the institution's partners and others that have a need to know the information and to access details about the institution and its services.

20 Claims, 11 Drawing Sheets

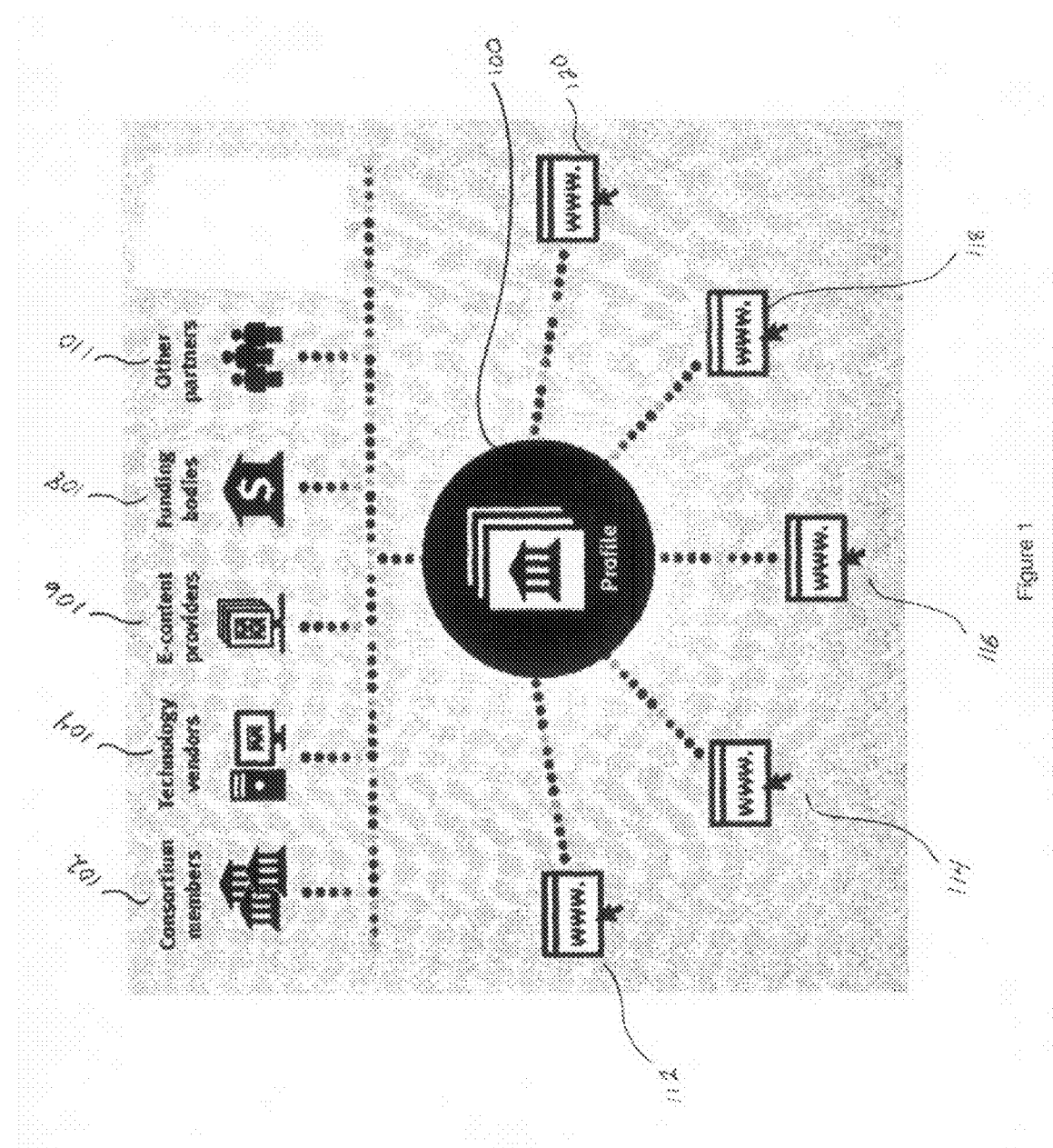

SYSTEM AND METHOD FOR UPDATING AND SHARING PRIVATE LIBRARY PROFILE DATA TO FACILITATE DELIVERY OF ELECTRONIC CONTENT TO LIBRARIES

CROSS-REFERENCES TO RELATED APPLICATIONS

None.

FIELD OF THE INVENTION

The present invention relates generally to software applications for maintaining registries of library information. In particular, the present invention is a web-based tool for updating and sharing private library profile data through a registry to facilitate delivery of content and services to libraries.

BACKGROUND OF THE INVENTION

Much of the content that libraries today provide to their patrons is obtained through electronic content subscriptions. To ensure access to the electronic content, libraries must provide vendors of electronic content with current information such as contact and distribution information and information about the electronic content to which they would like access. Management of electronic content subscriptions is an important and often time-consuming task that libraries must perform to ensure they receive the content they want and need to serve their patrons. Management of electronic content subscriptions is also an important task that vendors must perform to ensure their customers are provided with access to the electronic content they have selected.

Libraries often rely on consortia to facilitate library access to electronic content developed and offered by numerous vendors. A large or midsize consortium may provide its users with access to hundreds of online databases and thousands of electronic journals hosted on dozens of sites. Like libraries and vendors, consortia also require accurate and current information to facilitate the services they provide to the libraries and to the vendors that supply them with electronic content. A many-to-many problem, therefore, exists in the exchange of data among libraries, consortia, and electronic content vendors.

Currently, many vendors maintain separate closed registries of essentially the same kinds of library information such as contacts, geographic sites, IP addresses, etc. Libraries are expected to maintain this data in each vendor registry if they want to ensure continuity of service from the vendors. Each time a piece of data changes—such as a phone number, contact name, or Internet IP address—library staff must take the time to notify each vendor separately, and often by various means such as web interfaces, email messages, paper forms, faxes, and phone calls. Because this approach requires contacting each vendor separately using a different means, the possibility of "stale" data at one or more vendor sites is great.

Similar problems of data currency apply to consortia that serve libraries as well as vendors. To keep their services active, electronic resource professionals typically visit 30 or more vendor applications to maintain identifying information about the member institutions while using many different tools to complete the maintenance tasks. Worse still, staff at member institutions may first have to register their identity data with the consortium, which often is then re-keyed and submitted into vendor interfaces by consortium staff. In addition to experiencing time delays that could result in the entry of stale data, the re-keying of data may result in the entry of inaccurate data that further delays the delivery of electronic content to a particular member institution.

Another problem with current systems is a lack of security. There is no way to share the data or updates to data with multiple partners at one time and in a way that provides any type of protection from public disclosure. Email messages allow the same data to be shared easily with multiple parties, but the messages comprising the data that partners need are subject to interception and review by unauthorized parties. Email messages can be encrypted to prevent their disclosure but this approach requires providing the sending party with the ability to encrypt messages and the receiving parties with the ability to decrypt messages. Closed registries and other approaches may support secure connections to prevent the dissemination of information to authorized parties but they do not support sharing of the data or updates with multiple parties at once. A party that needs to update its information must visit each registry that has its information.

Librarians need the ability to send updates of data to every partner, or risk experiencing a loss of electronic content service for the library and its patrons. The task is time-consuming and librarians spent a great deal of time updating vendor and consortia partners when information about their institutions changes. There are currently 9,100 main public libraries and 3,500 academic libraries in the United States. Assuming each library has 10 contacts that it must maintain, 126,000 interactions (63,000 person hours or 2,625 days) are required to distribute current information. There is a need for a system and method for updating and sharing library profile data with partners that provides efficient and secure distribution of the data so that libraries can continue to serve their patrons with access to electronic content.

SUMMARY OF THE INVENTION

The present invention is a computer library service registry that supports updating and sharing of library profile data with partners. It comprises a directory of libraries and consortia, and the services they provide, and it comprises services to enable the secure exchange of data among libraries, consortia, and electronic content vendors. The registry is designed to help libraries and consortia manage and share data that define their organizations such as institution type, location, main and branch institutions, URLs for electronic services, circulation statistics, and population served—through a single web platform. Library profile data may be updated and shared with partners to facilitate the delivery of electronic content to libraries and their patrons.

Any institution or consortium may use the registry to share its profile with other libraries, technology vendors, electronic content providers, funding agencies, and other parties that could benefit from access to the information. A registry profile is shared via a special web link that provides instant, read-only access to current data. Sensitive information such as personal IP addresses and contact names, phone numbers, or email addresses are not made publicly available in the registry. web services that allow the query and retrieval of specific registry data by online applications are also available.

Users of the present invention may complete the following tasks:

1. Create and manage a profile—attached to a unique, persistent identifier—that centralizes and automates information sharing with vendors and others and that is easily and securely referenced by content providers, other vendors, and member institutions;

2. Keep electronic service data applicable to the entire group (such as IP addresses, shared catalogs and OpenURL servers) in one place; and 3. Associate members' individual registry profiles with a group's profile, and see status of members' profiles at-a-glance.

Profile data and member associations may be used to automate routine tasks such as activation or renewal of subscription electronic content services across the consortium. The registry profile holds many other kinds of identifying and administrative information, such as statistics and personnel contacts, that can help centralize information sharing within a group.

To provide updated profile data to others, libraries share a RSS-enabled obfuscated link with their partners that enables the partners to access a page with the latest institutional profile, and to be notified when it is updated. The obfuscation of the RSS feed link provides a notification mechanism while keeping the data private. Every time a librarian creates an institutional profile, an equivalent page is generated that can be reached through a RSS feed that has an obfuscated link name. The librarian shares this link with the library's partners, vendors, and others that have a need to know the information and to access details about the library and its services. The present invention increases efficiency by allowing the library to automate routine tasks such as activation of a new subscription service or renewal of an existing one.

BRIEF DESCRIPTION OF THE DRAWINGS

FIG. 2 is a registry profile page according to an example embodiment of the present invention;

FIG. 3 is an edit registry profile page according to an example embodiment of the present invention;

FIG. 4 is an edit administrative information page according to an example embodiment of the present invention;

FIG. 5 is an edit contacts page according to an example embodiment of the present invention;

FIG. 6 is an edit branches page according to an example embodiment of the present invention;

FIG. 7 is an add branch page according to an example embodiment of the present invention;

FIG. 8 is a manage profiles page according to an example embodiment of the present invention;

FIG. 9 is an edit IP addresses page according to an example embodiment of the present invention;

FIG. 10 is an add IP address page according to an example embodiment of the present invention; and FIG. 11 is a share profile page according to an example embodiment of the present invention.

DETAILED DESCRIPTION OF THE INVENTION

Figure 1:
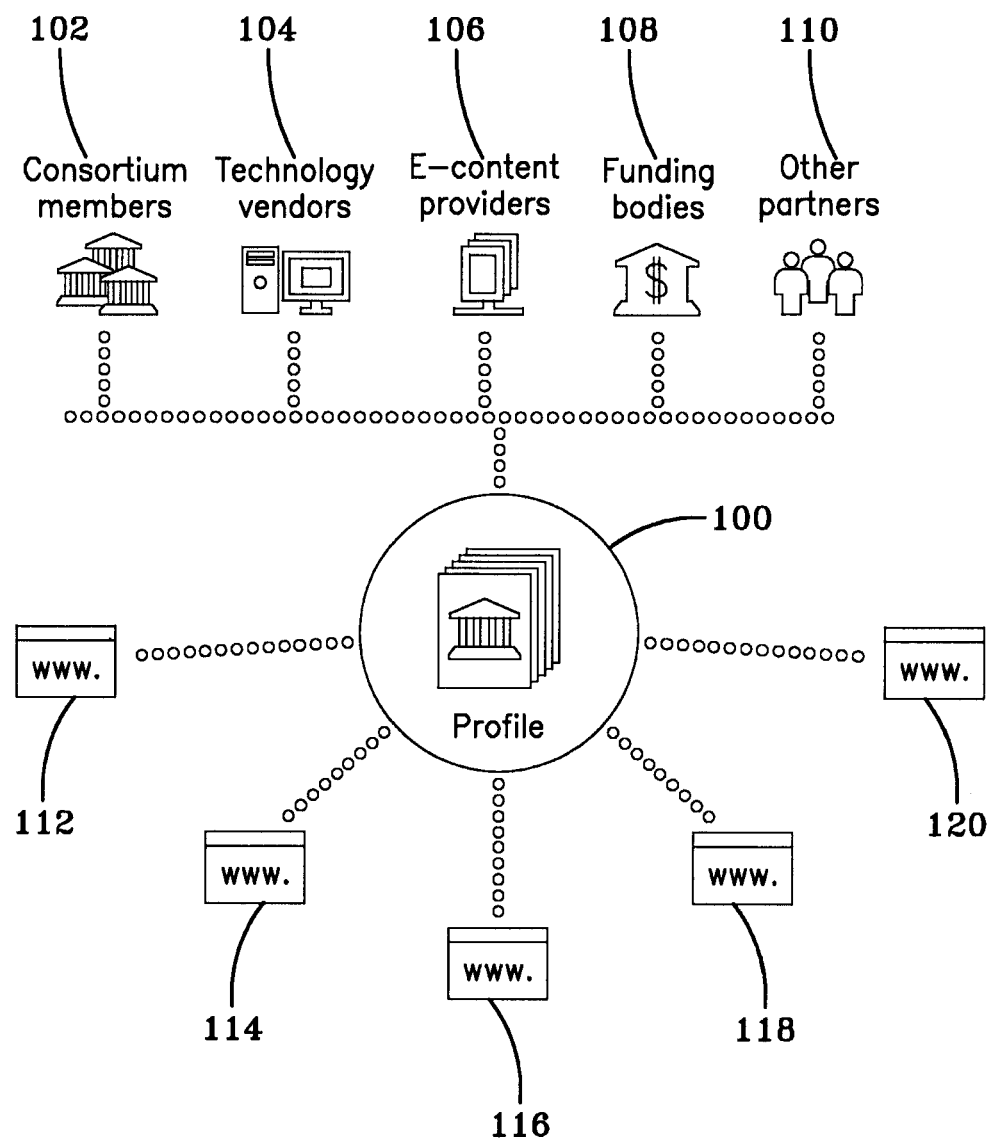
FIG. 1 is a diagram illustrating the system and method for sharing private library profile data according to an example embodiment of the present invention.

The registry and related services of the present invention provide libraries with a more efficient approach to establishing, maintaining, and disseminating an institutional identity that facilitates the delivery of electronic content to them and their patrons. Referring to FIG. 1, a diagram illustrating the system and method for sharing private library profile data according to an example embodiment of the present invention is shown. Libraries access a secure web platform to create and maintain a single, comprehensive profile 100 that includes information such as: institution name; "also known as" alias; institution type; identifying codes issued by industry organizations; institution address; business address; consortial memberships; parent-child relationships (main and branch institutions); URLs for electronic services; computer-network IP addresses; web-based services such as online catalog, "Ask-a" virtual reference, and OpenURL servers; vendors; circulation statistics, budgetary and service statistics; administrative contacts, and population served. The profile data is stored in a profile registry or database.

Libraries then share their registry profiles with partners such as fellow consortial institutions 102, technology vendors 104, electronic content or service providers 106, funding agencies 108, or other organizations 110 that could benefit from having the information. Libraries send their partners a RSS-enabled obfuscated link 112 114 116 118 that gives them instant, read-only access to the most current institutional data. Partners are notified of profile updates through the RSS feed, and they retrieve the data through a public web site. The data is kept private from general public access through the use of obfuscated links. The present invention provides a system and method for libraries and other institutions to share updates of data that is considered privileged (e.g., IP address data) with other institutions, vendors, service providers, and consortia.

The registry of the present invention has multiple levels of access. An authorized account has the highest level of access. The table below explains permitted activities within these levels and explains how to authorize an account:

TABLE 1

| Level of Access | What user can do |
| --- | --- |
| Anonymous | An anonymous user can search the registry and access basic information that is marked as public. Anonymous users cannot add or change any profile data. |
| Authenticated | An authenticated user is one who has created a new user account or signed in with one of several accepted computer library service accounts. Authentication proves to the computer library service that user's identity, but it does not recognize the user as being affiliated with (or authorized to act on the behalf of) any specific institution. An authenticated user can contribute data to an existing registry profile where data fields are blank, but is not authorized to change existing data or otherwise manage or share the profile. |
| Authorized | An authorized user is one whose user account is authenticated and has been given full authority to manage, edit, and share one or more registry profiles. Request for authorization is submitted to the computer library service and processed to confirm affiliation with the institution. |

A user may maintain registry profiles for more than one institution as long as the user is listed as an authorized user for each institution. Authorized users for an institution are maintained via an "Authorize Users" link on the profile summary page. A use may also request to be authorized via an "Authorize Me to Manage a Profile" link at the bottom of most registry pages.

Figure 2:
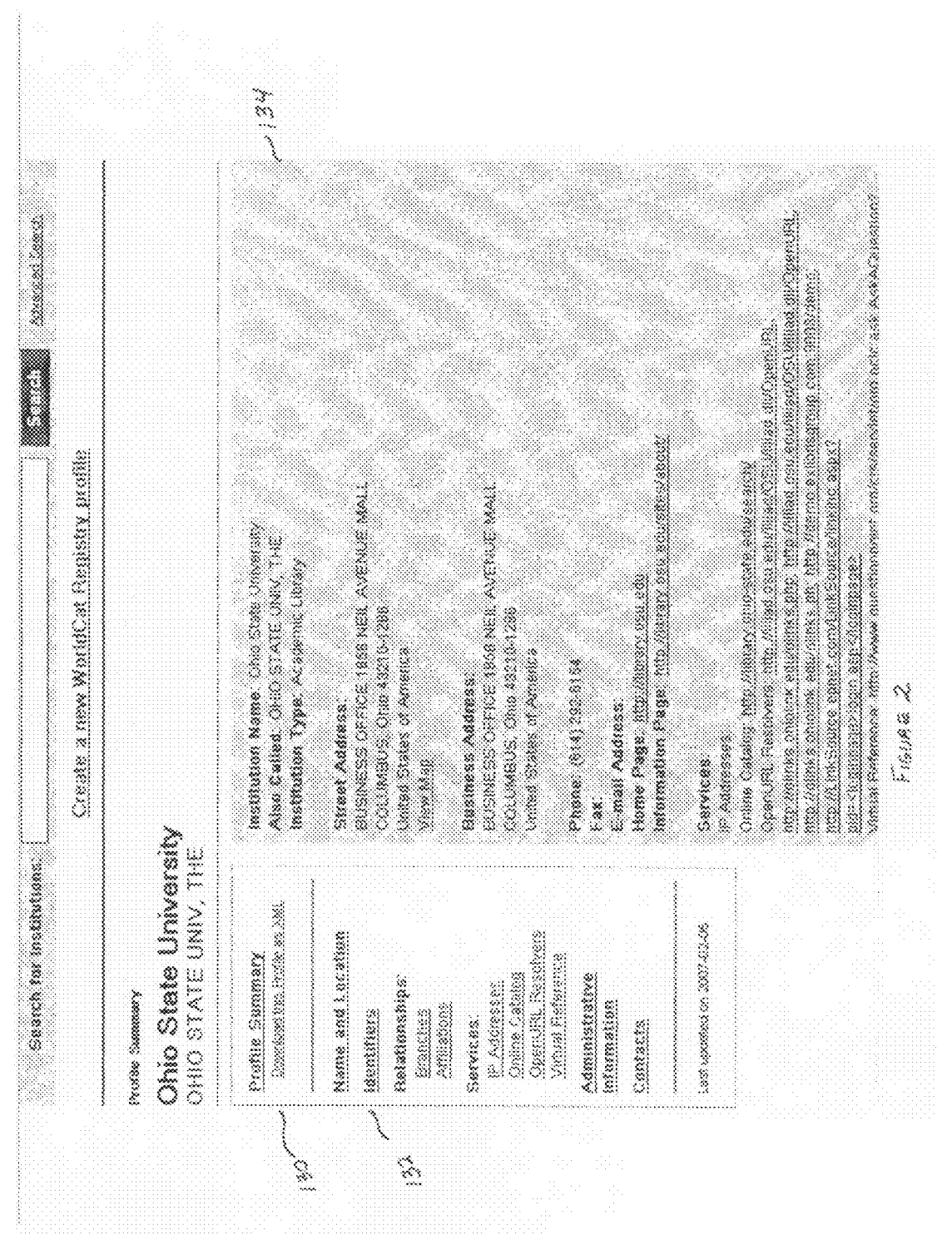

Referring to FIG. 2, a registry profile page according to an example embodiment of the present invention is shown. The profile page, which is used by authorized users, comprises one or more sections 130 132 with links to profile details and a section with information about the institution 134. The institution information comprises details such as institution name, an alias, an institution type, a street address, a business address, contact information, and a list of services.

In an example embodiment of the present invention, profiles are created and maintained in XML-formatted files. The XML-format file is used to create a RSS-enabled web page.

An XML-format file is also easily imported into a spreadsheet program such as Microsoft® Excel. Storing the file locally or on a network location as spreadsheet file may be preferred in some institutions' workflows. A local copy guards against the misplacing of data when key personnel leave and newly hired staff cannot find a paper trail. Staff who may not have access to the authorized user account used to update the profile can easily reference its information. The file may also be circulated at chosen time intervals among staff for review to ensure profile data is accurate.

Figure 3:
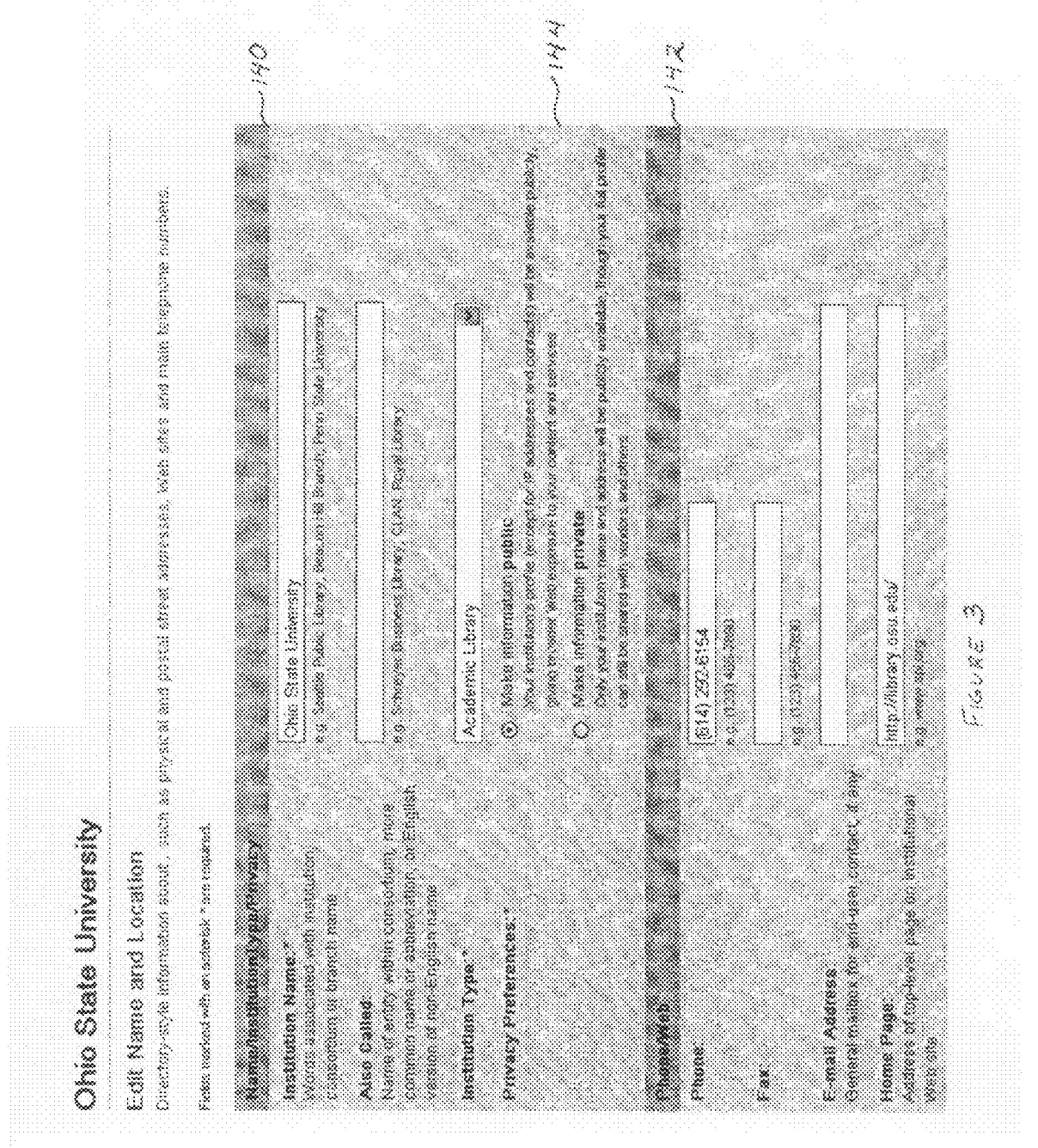

Referring to FIG. 3, an edit registry profile page according to an example embodiment of the present invention is shown. The page may be organized in various sections such as a Name/InstitutionType/Privacy section 140 and a Phone/web section 142. The institution may be asked to specify a privacy preference 144 that determines how much institution information may be shared with others. A "public" option results in sharing of the institution's profile data except for (IP addresses and contacts) while a "private" option results in sharing of only the institution's name and address. A "private" option still allows for sharing of full profile data with staff for internal purposes or with third party partners such as vendors and consortia.

Figure 4:
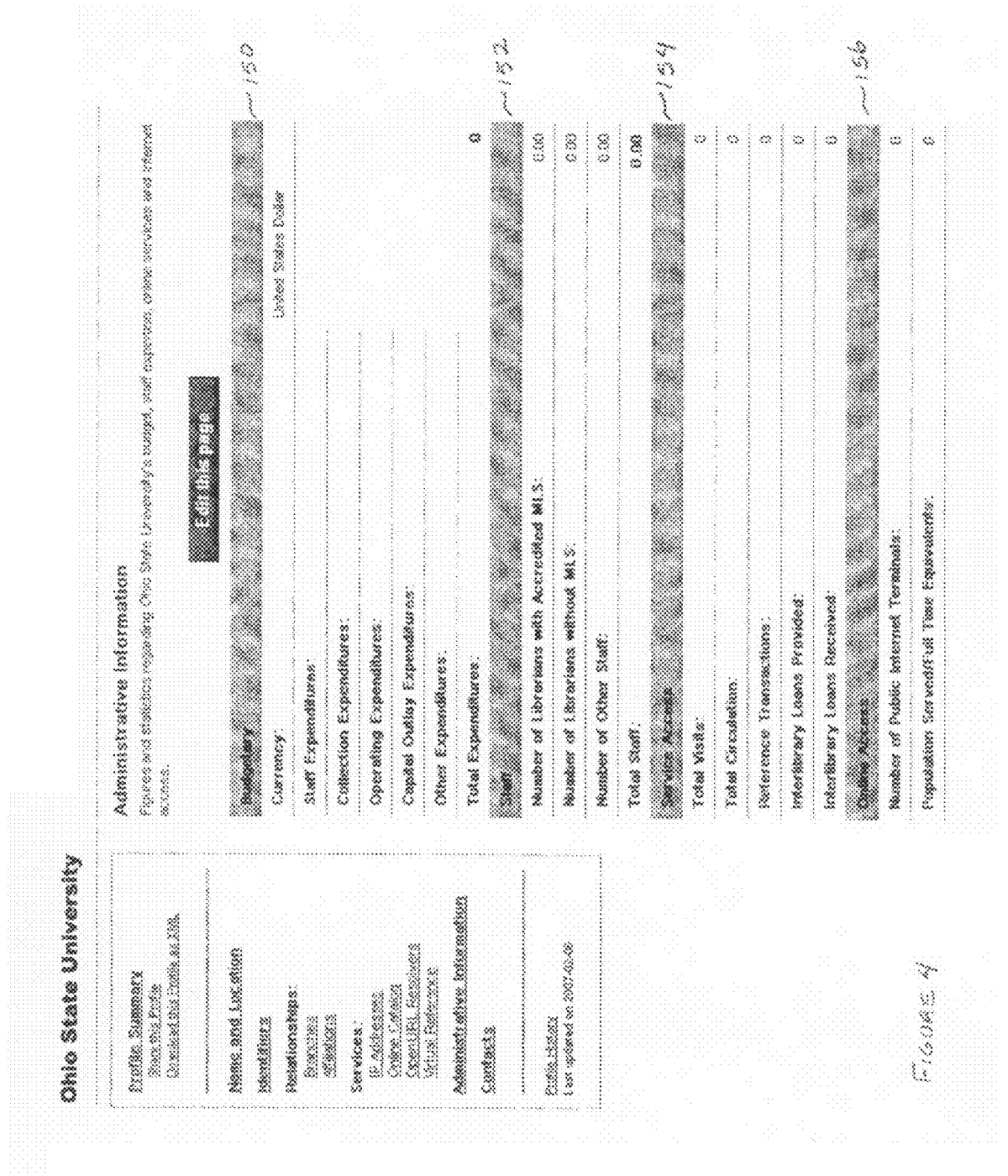

Referring to FIG. 4, an edit administrative information page according to an example embodiment of the present invention is shown. The page may be organized in various sections such as Budgetary 150, Staff 152, Service Access 154, and Online Access 156. These sections may comprise details about the expenditures made by the institution as well as staffing, circulation, interlibrary loan, and population served statistics.

Figure 5:
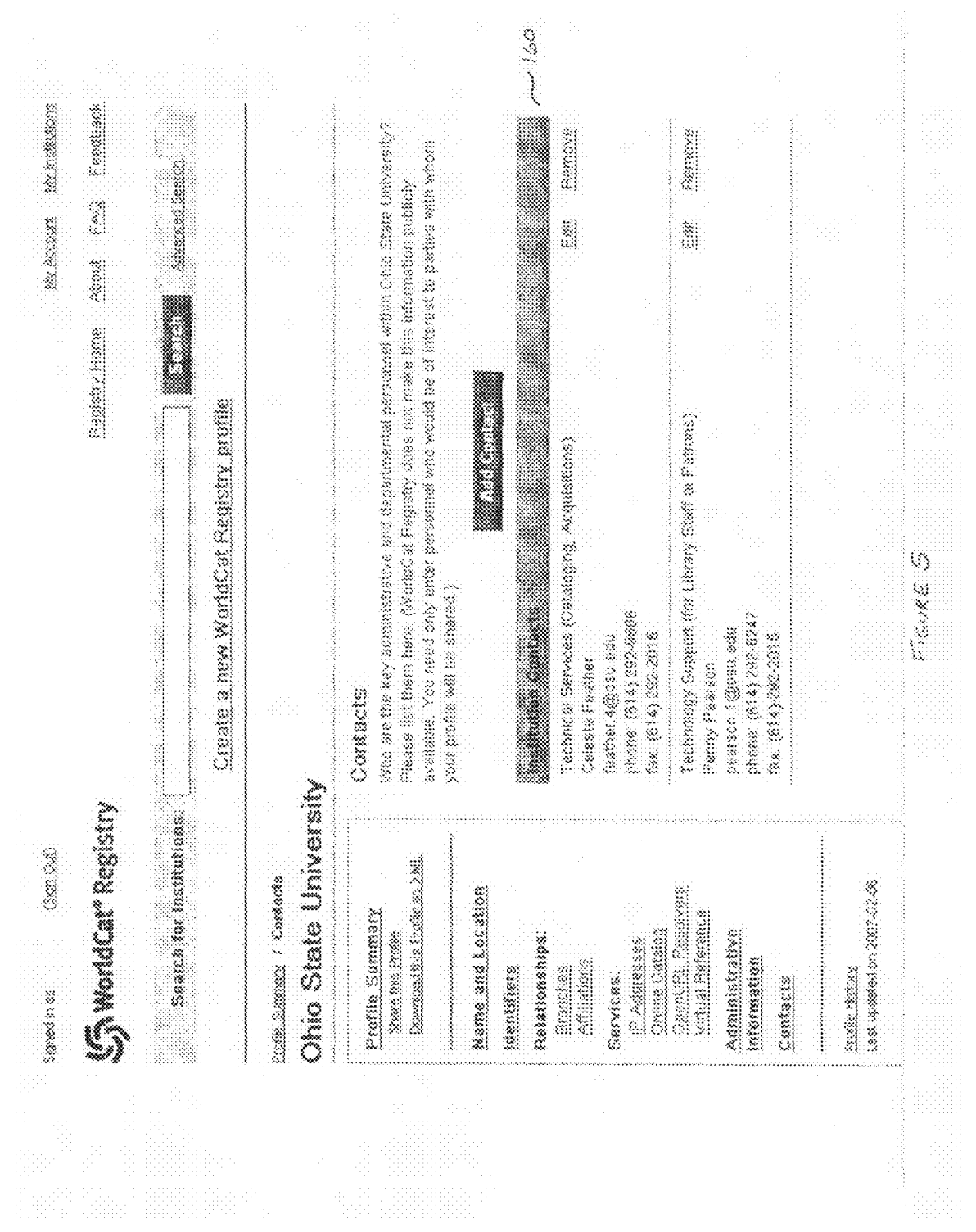

Referring to FIG. 5, an edit contacts page according to an example embodiment of the present invention is shown. The page comprises details about one or more individuals 160 who work for the institution and may be able to assist partners with questions they have in relation to the services or materials provided by the partner.

Figure 6:
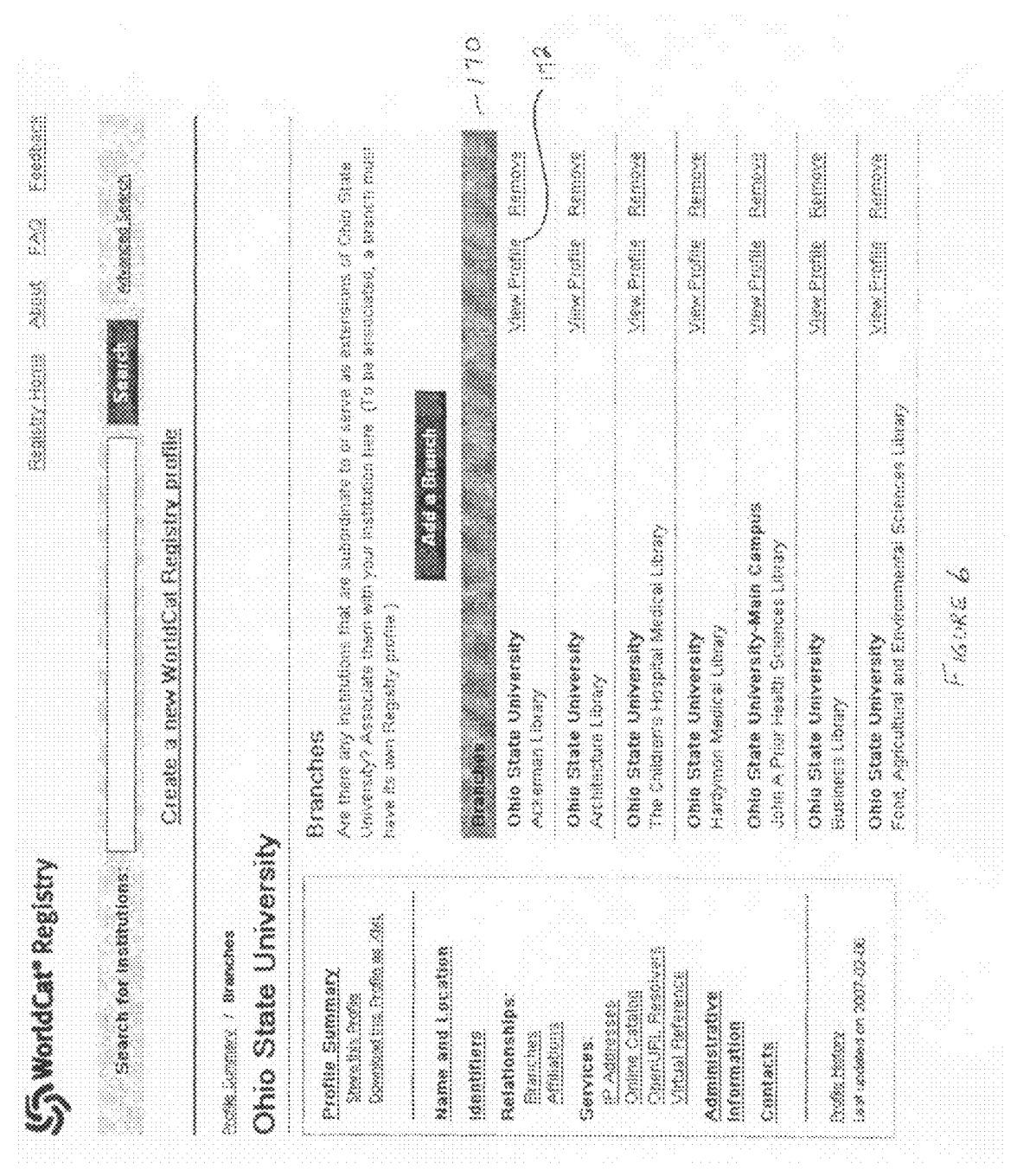
Figure 7:
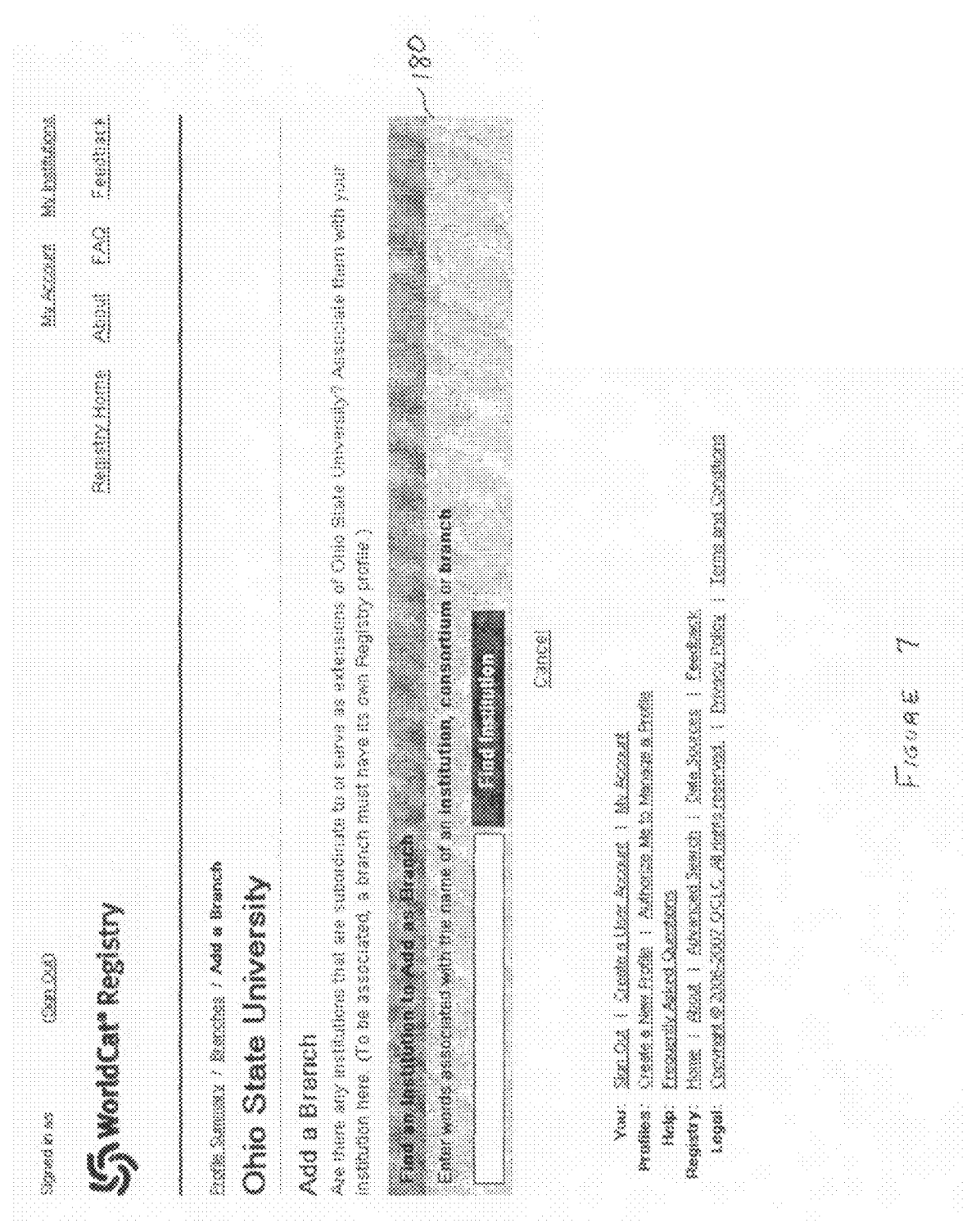

Referring to FIG. 6, an edit branches page according to an example embodiment of the present invention is shown. The branches page comprises details about one or more branches affiliated with the institution 170. Each branch may have its own profile page 172 that comprises contact information and details about the services offered by the branch. For many institutions, branch information changes frequently and sharing of updated information with partners is important to ensuring continuity of services to the institution's patrons. Referring to FIG. 7, an add branch page according to an example embodiment of the present invention is shown. Institutions can add to their own profiles information about affiliate institutions or branches 180.

Figure 8:
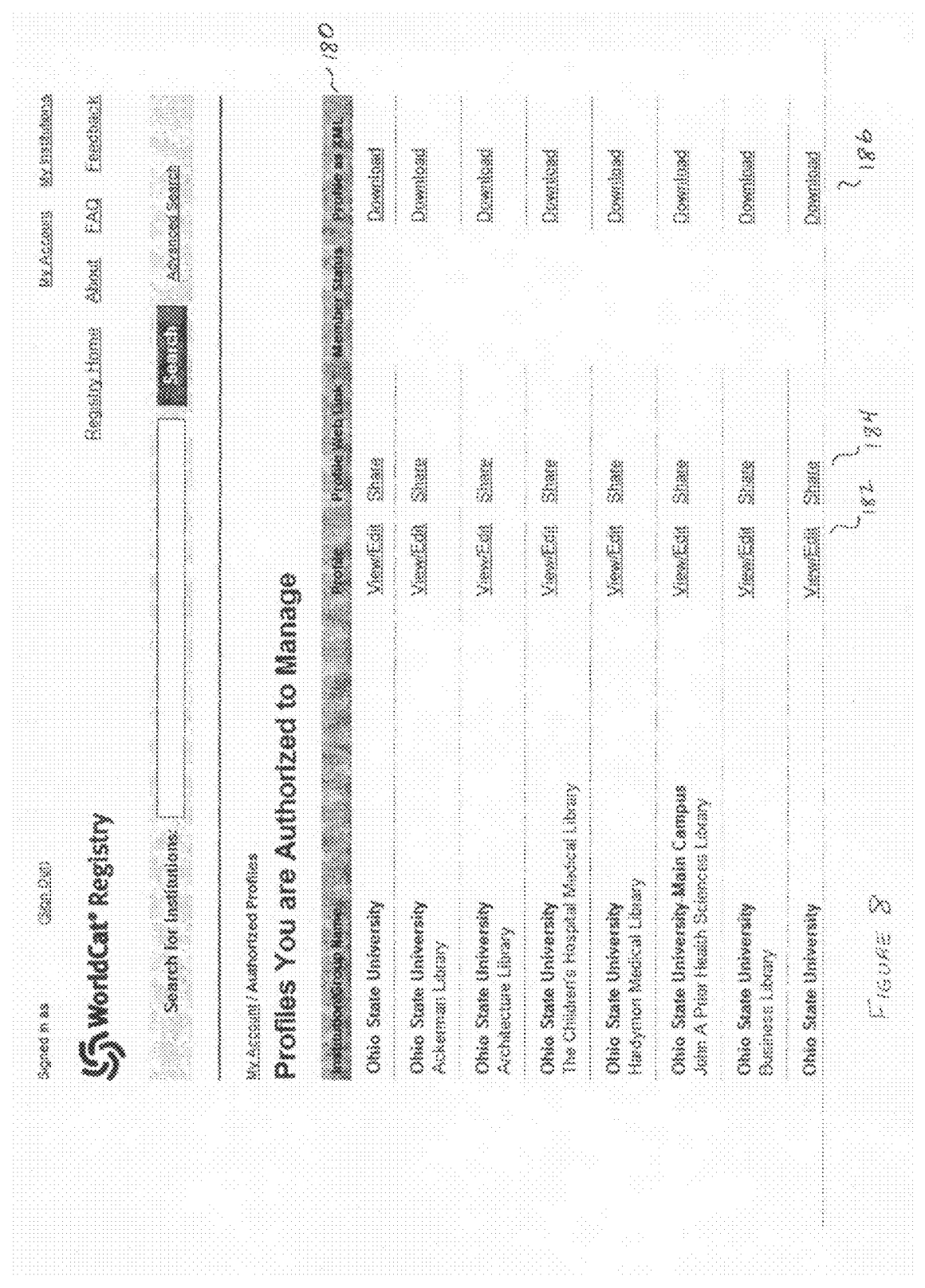

Referring to FIG. 8, a manage profiles page according to an example embodiment of the present invention is shown. An employee or representative of an institution may be authorized to manage a primary profile for an institution as well as profiles of affiliates. The institutions may be organized according to Institution/Group Name 180. For each institution, the user may view/edit a profile 182, arrange to share the profile data 184, or download the profile data as an XML file 186.

Figure 9:
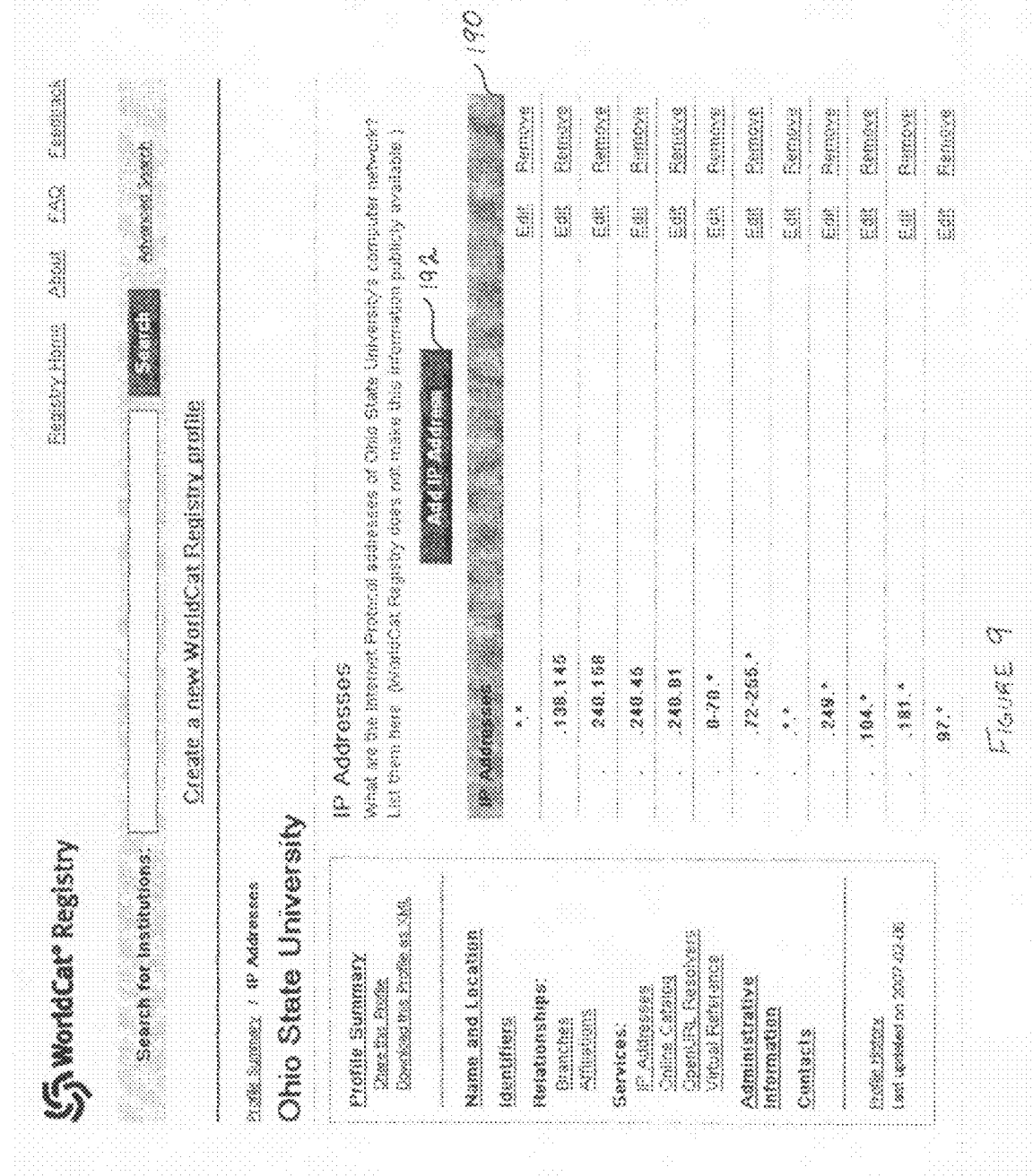
Figure 10:
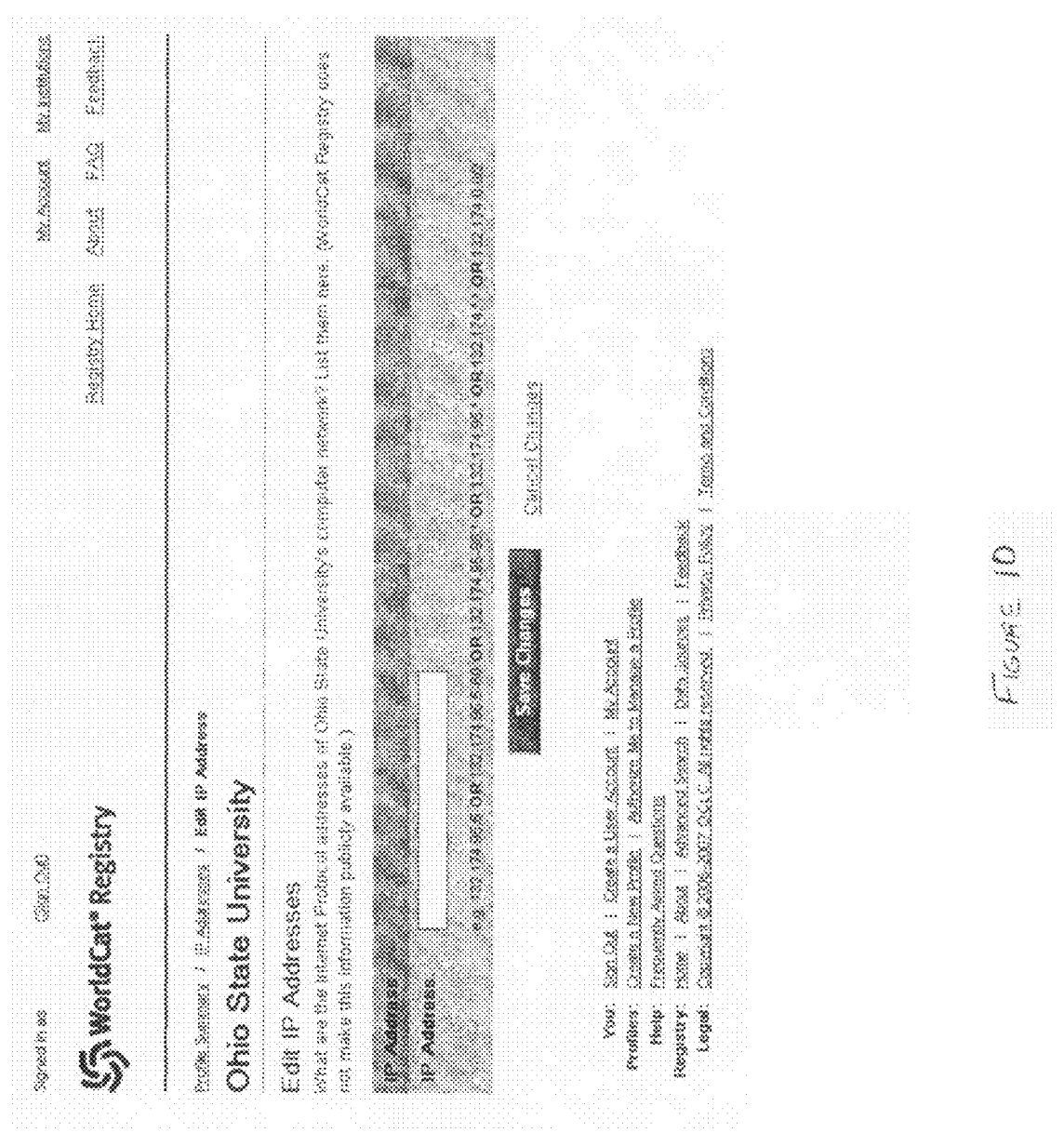

Referring to FIG. 9, an edit IP addresses page according to an example embodiment of the present invention is shown. The page allows a user to edit one or more IP addresses used by the institution 190. The page also provides an option for adding an IP address 192. Referring to FIG. 10, an add IP address page according to an example embodiment of the present invention is shown.

Figure 11:
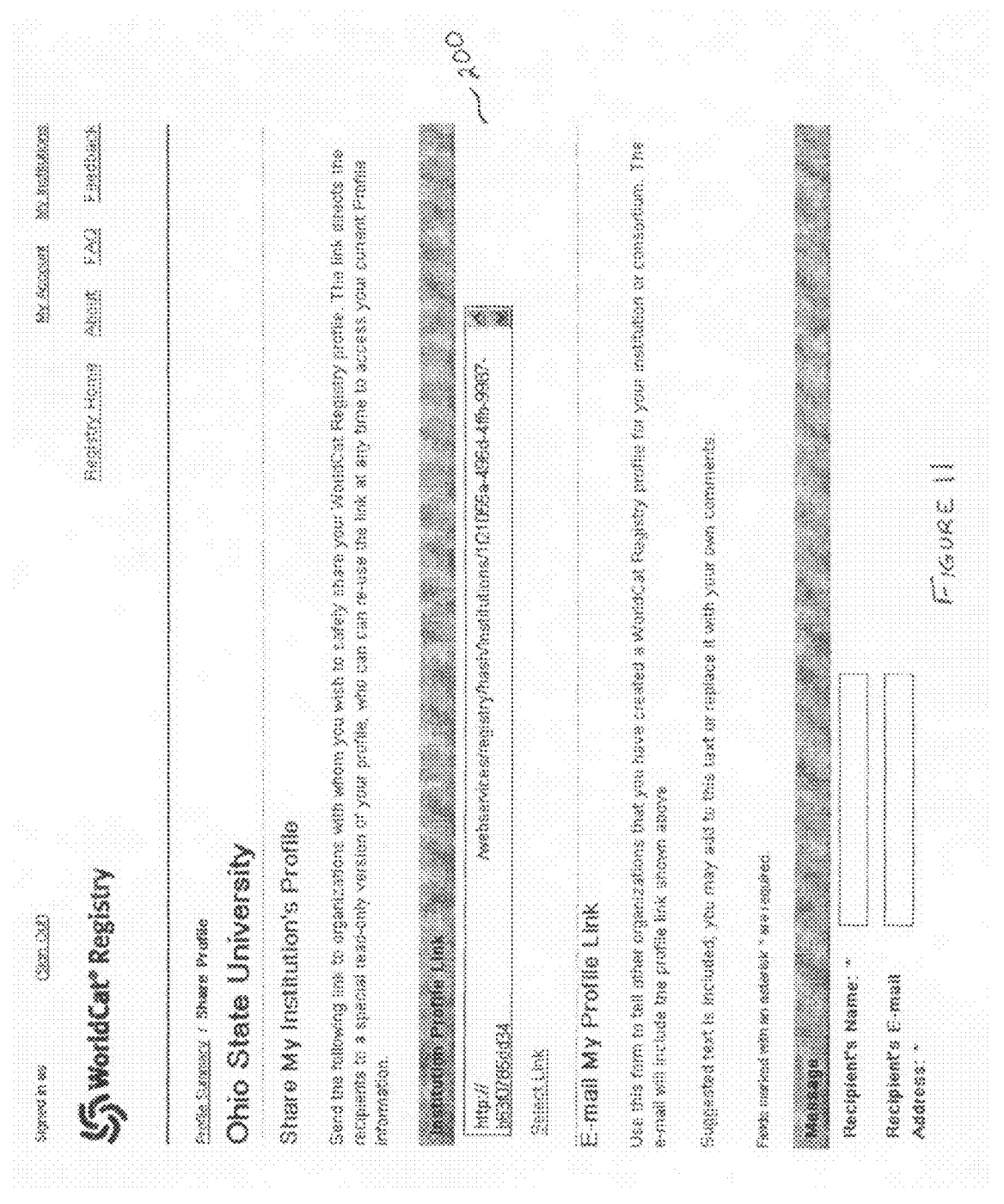

Referring to FIG. 11, a share profile page according to an example embodiment of the present invention is shown. Once an authorized user creates a profile, the user may arrange to share profile data with various partners. The registry interface of the present invention provides a special obfuscated link 200 that can be sent to vendors, consortia, funding bodies, internal staff—any person, organization, or partner that could benefit from having access to the institution's information. The link is "obfuscated" such that it displays random characters hiding encoded information, similar to authenticating links in subscription e-mail newsletters. The link is associated with a RSS-enabled web page of registry profile data created from the XML-formatted file. Anyone that receives the link has instant access to a special read-only version of the registry profile data in the RSS-enabled web page. Because the link is RSS-enabled, partners can acquire the most up-to-date information about the institution without calling the institution or requiring other action by the institution.

Partners with whom the profile data has been shared via the special RSS-enabled obfuscated link may monitor the information as a RSS feed. Using commonly available "newsreader" or "aggregator" applications, partners may subscribe to the profile data as a feed. Each partner's software application or web service checks for new or updated profile content at prescribed intervals, and then retrieves or highlights the profile data in the RSS-enabled web page when information has changed.

The use of RSS feeds makes the dissemination of updated information efficient for institutions as well as their partners. The RSS feeds for disseminating profile information provides programmatic access to large numbers of institutional profiles in the registry. Vendors and service partners can use registry data on an ongoing basis to save the costs involved in building and maintaining their own registry infrastructure, and to ensure the currency of their client information and thus the consistency and quality of their services to end users.

Although the primary users of the present invention are libraries, archives, museums, and other types of institutions may also benefit from using the present invention. An institution that consists of physical facilities with physical and/or electronic collections and/or services that cross multiple departments or branches, administered by one or more professionals may participate in the registry. There are no restrictions, however, that prevent a smaller physical entity such as a church library, or a "virtual" entity such as a digital library, from representing itself in the registry.

Institutions that register a profile also realize another key benefit—the visibility of their online services is increased and shared with other parties that might not otherwise find them. Over time and through a variety of standardized web services, the registry syndicates essential data—such as the library's web catalog's base URL or OpenURL resolver—across more and more web sites and web-enabled applications. More people discover, link to, and use the library's content.

Many institutions have to routinely provide many kinds of information about their physical operations, computer systems and people to a variety of organizations—vendors, publishers, partners, funding agencies, and fellow institutions. The present invention is beneficial to these institutions. It is useful to any organization that needs to share sensitive data and updates to that data with a number of partners in a timely but private way. Users access a central registry and update profile data in the registry as needed. Partners that need the profile data can receive it without additional effort for the user. Throughout the process, the security of the organization's sensitive data is maintained. The registry streamlines a necessary but time-consuming workflow.

While certain exemplary embodiments are described in detail above, the scope of the application is not to be considered limited by such disclosure, and modifications are possible without departing from the spirit of the invention as evidenced by the following claims:

The invention claimed is:

1. A computerized method for an organization to share profile data with a plurality of organizational partners comprising:
   a) receiving at a computer registry service profile data for said organization, said profile data comprising:
      1) identifying data for said organization; and
      2) contact data for said organization for receiving information from organizational partners of said organization;
   b) storing at said computer said registry service said profile data for said organization;
   c) in response to receiving said profile data, generating at said computer a RSS-enabled web page comprising at least a portion of said profile data;
   d) associating at said computer an obfuscated hyperlink with said RSS-enabled web page;
   e) receiving at said computer contact data for a plurality of organizational partners to receive said obfuscated hyperlink for accessing said RSS-enabled web page with said at least a portion of said profile data;
   f) distributing said obfuscated hyperlink via said contact data for said plurality of organizational partners of said organization;
   g) providing said plurality of organizational partners with RSS reader access to said profile data in said RSS-enabled web page using said obfuscated hyperlink;
   h) receiving updates to said profile data for said organization;
   i) generating a RSS-enabled web page for said updated profile data; and
   j) providing said plurality of organizational partners with RSS reader access to said updated profile data in said RSS-enabled web page using said obfuscated hyperlink.

2. The method of claim 1 wherein said organization is a library.

3. The method of claim 2 wherein said profile data comprises an institution name, an alias, an institution type, an identifying code, a street address, a business address, consortial memberships, main and branch institutions, URLs for electronic services, computer-network IP addresses, descriptions of web-based services, vendors, circulation statistics, budgetary statistics, service statistics, administrative contacts, and population served description.

4. The method of claim 2 wherein said at least one organizational partner is selected from the group consisting of consortial institutions, technology vendors, electronic content providers, electronic service providers, and funding agencies.

5. The method of claim 1 wherein said RSS-enabled web page comprising at least a portion of said profile data comprises only contact information for said organization.

6. The method of claim 2 wherein said RSS-enabled web page comprising at least a portion of said profile data comprises consortial memberships, main and branch institutions, URLs for electronic services, computer-network IP addresses, descriptions of web-based services, vendors, circulation statistics, budgetary statistics, service statistics, administrative contacts, and population served description.

7. A computerized system for use by an organization to share profile data with at least one organizational partner comprising:

a first web-based software application executing at a computer for:
   a) prompting a computer user to provide registry service profile data for said organization; and
   b) receiving said registry server profile data;
a database for storing at said computer said profile data for said organization;
a second software application executing at a computer for:
   a) generating in response to receiving said profile data a RSS-enabled web page, said RSS-enabled web page comprising at least a portion of said profile data for said organization;
   b) generating an obfuscated hyperlink for accessing said RSS-enabled web page;
   c) associating said obfuscated hyperlink with said RSS-enabled web page;
   d) receiving at said computer contact data for a plurality of organizational partners of said organization;
   e) distributing said obfuscated hyperlink via said contact data to said plurality of organizational partners of said organization; and
   f) posting said RSS-enabled web page at a web site to permit said plurality of organizational partners to access said RSS-enabled web page using said obfuscated link and a RSS reader.

8. The system of claim 7 wherein said organization is a library.

9. The system of claim 8 wherein said profile data comprises an institution name, an alias, an institution type, an identifying code, a street address, a business address, consortial memberships, main and branch institutions, URLs for electronic services, computer-network IP addresses, descriptions of web-based services, vendors, circulation statistics, budgetary statistics, service statistics, administrative contacts, and population served description.

10. The system of claim 7 wherein said plurality of organizational partners is selected from the group consisting of other libraries, consortial institutions, technology vendors, electronic content providers, electronic service providers, and funding agencies.

11. The system of claim 10 wherein said RSS-enabled web page comprising at least a portion of said profile data comprises consortial memberships, main and branch institutions, URLs for electronic services, computer-network IP addresses, descriptions of web-based services, vendors, circulation statistics, budgetary statistics, service statistics, administrative contacts, and population served description.

12. The system of claim 11 wherein said web-based software application prompts said computer user to select a public option to share said profile data comprising consortial memberships, main and branch institutions, URLs for electronic services, computer-network IP addresses, descriptions of web-based services, vendors, circulation statistics, budgetary statistics, service statistics, administrative contacts, and population served description.

13. The system of claim 7 wherein said RSS-enabled web page comprising at least a portion of said profile data comprises only contact information for said organization.

14. The system of claim 13 wherein said web-based software application prompts said computer user to select a private option to share only contact information for said organization.

15. A computerized method for distributing organizational profile data to a plurality of organizational partners comprising:

a) receiving at a computer organizational profile data comprising:
1) identifying data for said organization; and
2) contact data for receiving information from organizational partners of said organization;
b) in response to receiving said organizational profile data, generating at said computer an RSS-enabled web page comprising at least a portion of said organizational profile data;
c) associating at said computer an obfuscated hyperlink with said RSS-enabled web page;
d) prompting a computer user to provide contact data for a plurality of organizational partners to receive said organizational profile data;
e) distributing from said computer said obfuscated hyperlink via said contact data to said plurality of organizational partners identified by said computer user; and
f) posting said RSS-enabled web page comprising said at least a portion of said organizational profile data at a web site associated with said obfuscated hyperlink for access by said plurality of organizational partners using said obfuscated hyperlink and a RSS reader.

16. The method of claim 15 wherein said organizational profile data is profile data for a library.

17. The method of claim 16 wherein said organizational profile data comprises an institution name, an alias, an institution type, an identifying code, a street address, a business address, consortial memberships, main and branch institutions, URLs for electronic services, computer-network IP addresses, descriptions of web-based services, vendors, circulation statistics, budgetary statistics, service statistics, administrative contacts, and population served description.

18. The method of claim 15 wherein said plurality of organizational partners are selected from the group consisting of consortial institutions, technology vendors, electronic content providers, electronic service providers, and funding agencies.

19. The method of claim 15 wherein said RSS-enabled web page comprising at least a portion of said organizational profile data comprises only contact information for an organization.

20. The method of claim 16 wherein said RSS-enabled web page comprising at least a portion of said organizational profile data comprises consortial memberships, main and branch institutions, URLs for electronic services, computer-network IP addresses, descriptions of web-based services, vendors, circulation statistics, budgetary statistics, service statistics, administrative contacts, and population served description.

* * * * *

UNITED STATES PATENT AND TRADEMARK OFFICE
CERTIFICATE OF CORRECTION

| | |
|---|---|
| PATENT NO. | : 7,730,107 B1 |
| APPLICATION NO. | : 11/840623 |
| DATED | : June 1, 2010 |
| INVENTOR(S) | : Shultz et al. |

It is certified that error appears in the above-identified patent and that said Letters Patent is hereby corrected as shown below:

The illustrative Fig. 1 on the Title Page should be deleted and replaced with the illustrative Fig. 1 on the attached page.

Drawing sheets, consisting of Figs. 1-11 should be deleted and replaced with the drawing sheets consisting of Figs. 1-11, as shown on the attached pages.

Signed and Sealed this

Twenty-seventh Day of July, 2010

David J. Kappos
*Director of the United States Patent and Trademark Office*

(12) United States Patent
Shultz et al.

(10) Patent No.: US 7,730,107 B1
(45) Date of Patent: Jun. 1, 2010

(54) SYSTEM AND METHOD FOR UPDATING AND SHARING PRIVATE LIBRARY PROFILE DATA TO FACILITATE DELIVERY OF ELECTRONIC CONTENT TO LIBRARIES

(75) Inventors: Robert Scott Shultz, Lewis Center, OH (US); Joanna White, Dublin, OH (US); Kathleen Quinton, Westerville, OH (US); Jeffrey Allen Young, Columbus, OH (US)

(73) Assignee: OCLC Online Computer Library Center, Inc., Dublin, OH (US)

( * ) Notice: Subject to any disclaimer, the term of this patent is extended or adjusted under 35 U.S.C. 154(b) by 272 days.

(21) Appl. No.: 11/840,623

(22) Filed: Aug. 17, 2007

(51) Int. Cl.
*G06F 17/00* (2006.01)
(52) U.S. Cl. .................................. 707/802; 715/234
(58) Field of Classification Search ............... 707/802; 715/234
See application file for complete search history.

(56) References Cited

U.S. PATENT DOCUMENTS

| | | | |
|---|---|---|---|
| 6,029,195 A * | 2/2000 | Herz | 725/116 |
| 7,409,393 B2 * | 8/2008 | Gregoire et al. | 707/10 |
| 2004/0260781 A1 * | 12/2004 | Shostack et al. | 709/207 |
| 2005/0160167 A1 * | 7/2005 | Cheng et al. | 709/224 |
| 2008/0162537 A1 * | 7/2008 | Mancini | 707/102 |

OTHER PUBLICATIONS

Feather, Celeste and Shultz, Scott, WorldCat Registry, Making the case for a comprehensive registry of library data, PowerPoint Presentation, Feb. 22, 2007, 36 pages, Georgia Institute of Technology.
WorldCat Registry offers management of organizational data, OCLC Online Computer Library Center, Inc., Press Release, Feb. 26, 2007, 2 pages, Dublin, Ohio.

* cited by examiner

*Primary Examiner*—Shahid A Alam
*Assistant Examiner*—Noosha Arjomandi
(74) *Attorney, Agent, or Firm*—Standley Law Group LLP

(57) ABSTRACT

A service registry that supports updating and sharing of profile data with partners. The registry allows organizations such as libraries and consortia to manage and share data that define their organizations (e.g., institution type, location, main and branch institutions, URLs for electronic services, circulation statistics, and population served). Organizations share a RSS-enabled obfuscated link with their partners that enables the partners to access a page with the latest institutional profile, and to be notified when it is updated. The obfuscation of the RSS feed provides a notification while keeping the data private. Every time a user creates an institutional profile, an equivalent RSS-enabled page is generated that can be reached through a RSS feed that has an obfuscated link name. The user shares this link with the institution's partners and others that have a need to know the information and to access details about the institution and its services.

20 Claims, 11 Drawing Sheets

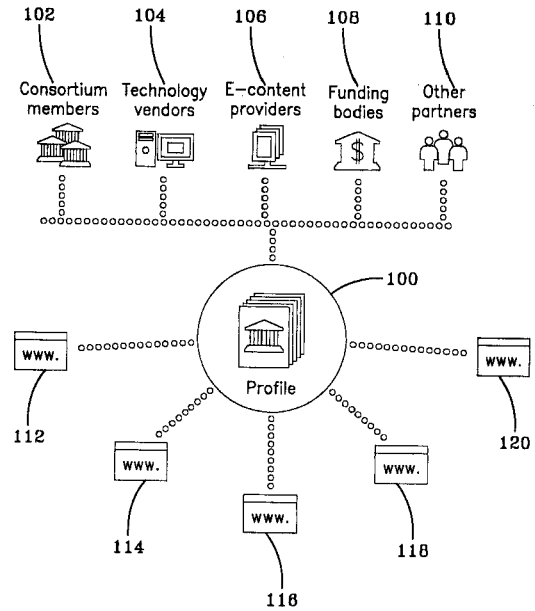

Search for Institutions: [____] [Search] Advanced Search

Create a new Registry profile

---

Profile Summary

Profile Summary
Download this profile as XML

Name and Location

Identifiers

Relationships:
 Branches
 Affiliations

Services:
 IP Addresses
 Online Catalog
 OpenURL Resolvers
 Virtual Reference

Administrative
Information

Contacts

---

Institution Name: State University
Also Called: STATE UNIV, THE
Institution Type: Academic Library Street Address:
BUSINESS OFFICE 1000 Main Street
COLUMBUS, Ohio 43210-1286
United States of America
View Map Business Address:
BUSINESS OFFICE 1000 Main Street
COLUMBUS, Ohio 43210-1286
United States of America Phone: (614) 555-5555
Fax:
E-Mail Address:
Home Page: http://library.su.edu
Information Page: http://library.state.edu/sites/about/

Services:
IP Addresses:
Online Catalog: http://library.state.edu/search/
OpenURL Resolvers: http://iliad.su.edu/iliad.SU/iliad.dll/OpenURL;

FIG-2

Edit Name and Location

Directory-style information about, such as physical and postal street addresses, Web sites and main telephone numbers
Fields marked with an asterisk* are required.

Name/Institution Type/Privacy — 140

Institution Name:  [ State University ]
*Words associated with institution, consortium or branch name*
e.g. Public Library, Hill Branch, State University

Also Called:  [ ]
*Name of entity with consortium, more common name or abbreviation, or English version of non-English name*
e.g. Business Library, CLAN, Royal Library

Institution Type:  [ Academic Library ▽ ]

Privacy Preferences:* — 144

⦿ Make information public
  Your Institution's profile (except IP addresses and contacts) will be available publicly, giving broader Web exposure to your content and services.

○ Make information private
  Only your Institution's name and address will be publicly available, though your full profile can still be shared with vendors and others.

Phone/Web — 142

Phone: [ (614) 555-5555 ]

Fax: [ ]

Email Address: [ ]
*General mailbox for end-user contact, if any*

Home Page: [ http://library.su.edu/ ]
*Address of top-level page on institutional Web site*

FIG-3

FIG-4

| State University | |
|---|---|
| Profile Summary | Administrative Information |
| Share this Profile | Figures and statistics regarding State University's budget, staff expertise, online services and Internet access. [Edit this page] |
| Download this Profile as XML | |
| Name and Location | Budgetary — 150 |
| Identifiers | Currency: United States Dollar |
| Relationships: | Staff Expenditures: |
| Branches | Collection Expenditures: |
| Affiliations | Operating Expenditures: |
| Services: | Capital Outlay Expenditures: |
| IP Addresses | Other Expenditures: |
| Online Catalog | Total Expenditures: 0 |
| OpenURL Resolvers | Staff — 152 |
| Virtual Reference | Number of Librarians with Accredited MLS: 0.00 |
| Administrative Information | Number of Librarians without MLS: 0.00 |
| Contacts | Number of Other Staff: 0.00 |
| | Total Staff: 0.00 |
| | Service Access — 154 |
| | Total Visits: 0 |
| | Total Circulation: 0 |
| | Reference Transactions: 0 |
| | Interlibrary Loans Provided: 0 |
| | Interlibrary Loans Received: 0 |
| | Online Access — 156 |
| | Number of Public Internet Terminals: 0 |
| | Population Served/Full Time Equivalents: 0 |

Search for Institutions: [    ] [Search]  Advanced Search

Create a new Registry profile

Profile Summary / Contacts

Profile Summary
Download this Profile as XML

Name and Location

Identifiers

Relationships:
  Branches
  Affiliations

Services:
  IP Addresses
  Online Catalog
  OpenURL Resolvers
  Virtual Reference

Administrative Information

Contacts

Contacts
Who are the key administrative and departmental personnel within State University? Please list them here. (Registry does not make this information publicly available. You need only enter personnel who would be of interest to parties with whom your profile will be shared.)

[Add Content]

Institution Contacts — 160

Technical Services (Cataloging, Acquisitions)   Edit   Remove
Jane Smith
smith@su.edu
phone: (614) 555-5555
fax: (614) 555-5550

Technology Support (for Library Staff or Patrons)   Edit   Remove
John Smith
smithj@su.edu
phone: (614) 555-5555
fax: (614) 555-5550

FIG-5

Search for Institutions: [          ] [Search] [Advanced Search]

Create a new Registry profile

Profile Summary / Branches

Profile Summary
Download this Profile as XML

Name and Location

Identifiers

Relationships:
  Branches
  Affiliations

Services:
  IP Addresses
  Online Catalog
  OpenURL Resolvers
  Virtual Reference Administrative Information Contacts

Branches
Are there any institutions that are subordinate to or serve as extensions of State University? Associate them with your institution here. (To be associated, a branch must have its own Registry profile.)

[Add a Branch] — 172

— 170

| Branches | | |
|---|---|---|
| State University Main Library | View Profile | Remove |
| State University Architecture Library | View Profile | Remove |
| State University The Children's Hospital Medical Library | View Profile | Remove |
| State University Medical Library | View Profile | Remove |
| State University Health Sciences Library | View Profile | Remove |
| State University Business Library | View Profile | Remove |
| State University Food, Agricultural and Environmental Sciences Library | View Profile | Remove |

FIG-6

Profile Summary / Branches / Add a Branch

Add a Branch

Are there any institutions that are subordinate to or serve as extensions of State University? Associate them with your institution here. (To be associated, a branch must have its own Registry profile.)

Find an Institution to Add as a Branch

Enter words associated with the name of an institution, consortium or branch

[          ]   [ Find Institution ]   — 180

Cancel

FIG-7

| Search for Institutions: | | Search | | Advanced Search |
|---|---|---|---|---|

My Account / Authorized profiles
Profiles You are Authorized to Manage

| Institution/Group Name | Profile | Profile Web Link | Member Status | Profile as XML |
|---|---|---|---|---|
| State University | View/Edit | Share | | Download |
| State University Main Library | View/Edit | Share | | Download |
| State University Architecture Library | View/Edit | Share | | Download |
| State University The Children's Hospital Medical Library | View/Edit | Share | | Download |
| State University Medical Library | View/Edit | Share | | Download |
| State University Health Sciences Library | View/Edit | Share | | Download |
| State University Business Library | View/Edit | Share | | Download |

FIG-8

FIG-9

Profile Summary / IP Addresses / Edit IP Address

Edit IP Addresses

What are the Internet Protocol addresses of State University's computer network? List them here. (Registry does not make this information publicly available.)

IP Address

IP Address:

e.g. 132.174.95.5 OR 132.174.95.5-60 OR 132.174.95.5-98* OR 132.174.95.* OR 132.174.*.* OR 132.174.0.0/2

Save Changes    Cancel Changes

FIG-10

Profile Summary / Share Profile

Share My Institution's Profile
Send the following link to organizations with whom you wish to safely share your Registry profile. The link directs the recipients to a special read-only version of your profile, who can re-use the link at any time to access your current Profile information.

Institution Profile Link http:// /webservices/registry/hash/Institutions/1f21055a-496d-4ffb-9987- — 200
b63f0785dd34

Select Link

E-mail My Profile Link
Use this form to tell other organizations that you have created a Registry profile for your institution or consortium. The e-mail will include the profile link shown above.

Suggested text is included; you may add to this text or replace it with your own comments.

Fields marked with an asterisk* are required.

Message

Recipient's Name:*

Recipient's E-mail Address:*

FIG-11